United States Patent [19]
Profitt et al.

[11] 3,970,793
[45] July 20, 1976

[54] TELEPHONE-CALL TOLL MONITOR AND INDICATOR

[76] Inventors: Leslie M. Profitt, 147 Sunset Court, Monroe, Ohio 45050; Merle E. Lehmer, Jr., 810 Melody Drive, North Huntingdon, Pa. 15642

[22] Filed: Oct. 25, 1974

[21] Appl. No.: 518,169

[52] U.S. Cl. .............................. 179/7.1 R; 58/152 T
[51] Int. Cl.² ........................................ H04M 15/18
[58] Field of Search ............ 179/7.1 R, 7 R, 7.1 TP; 58/152 T, 145 D

[56] References Cited
UNITED STATES PATENTS

| | | | |
|---|---|---|---|
| 2,911,144 | 11/1959 | Lee et al. ........................... | 179/7.1 R |
| 3,075,698 | 1/1963 | Fletcher............................ | 179/7.1 R |
| 3,390,395 | 6/1968 | Gamburd et al. ................. | 179/7.1 R |
| 3,508,392 | 4/1970 | Temps, Jr. ........................ | 179/7.1 R |
| 3,512,355 | 5/1970 | Lang ................................. | 179/7.1 R |
| 3,673,793 | 7/1972 | Barnard ........................... | 179/7.1 R |
| 3,767,862 | 10/1973 | Grushow........................... | 179/7.1 R |

Primary Examiner—Kathleen H. Claffy
Assistant Examiner—Gerald L. Brigance
Attorney, Agent, or Firm—Samuel Lebowitz

[57] ABSTRACT

A long-distance telephone-call monitor and charge indicator, contained in a common housing with an electrically operated digital clock timing device. The timing device is coupled to the charge indicator at the start of the telephone conversation by first pre-setting the indicator to the fixed cost of the conversation for a limited period, for example, three minutes, and thereafter setting a rate indicating lever corresponding to the cost of the incremental periods thereafter, for example, additional minutes. The movement of the latter from an "off" position, effects the coupling of a variable speed-ratio friction drive with the timing device, which is automatically delayed for the above-mentioned period of three minutes. The housing includes a convenient facility for a continuous paper supply on which may be noted information pertinent to the telephone conversation, at the end of which, the indicator is uncoupled from the clock drive for manual resetting to its zero value, preparatory to making the next long-distance telephone-call.

25 Claims, 15 Drawing Figures

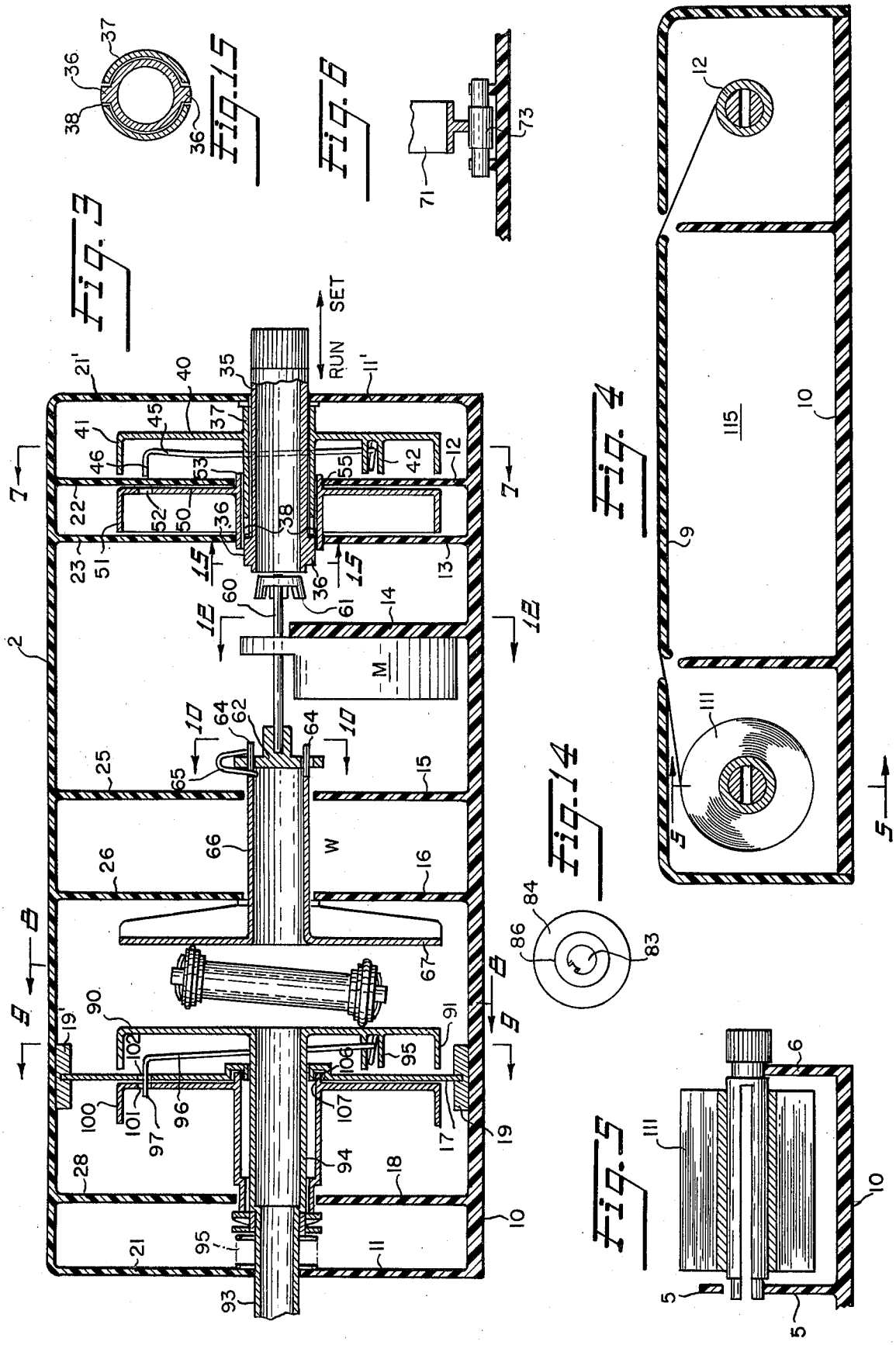

TELEPHONE-CALL TOLL MONITOR AND INDICATOR

This invention relates to a telephone-call toll monitor and indicator, and particularly one which combines a toll charge accumulator with a clock device, so that one may note both the passage of time and the accumulation of charges in the course of conducting a long distance telephone conversation.

It is the object of the present invention to provide an electrically operated digital clock combined with a charge indicator, which is capable of being preset for an initial 3-minute period of a telephone conversation, and which may be set for different rates per minute thereafter, depending upon the fixed initial charge of long distance calls, to which may be added the charges accumulated by the continuance of a telephone conversation.

It is another object of the invention to provide a rugged and reliable timing device and charge accumulator mechanism, which are mounted within a unitary housing, and which, in addition, is provided with conveniences for recording desired and useful information incidental to the telephone conversations and the charges therefor.

Other objects and purposes will appear from the detailed description of the invention following hereinafter, taken in conjunction with the accompanying drawings, wherein FIG. 1 is a perspective view of the telephone toll monitor and charge indicator in accordance with the invention;

FIG. 3 is a vertical sectional view along line 3—3 of FIG. 2;

FIG. 4 is a vertical sectional view along line 4—4 of FIG. 2;

FIG. 5 is a vertical sectional view along line 5—5 of FIG. 4;

FIG. 6 is a vertical sectional view along line 6—6 of FIG. 8;

FIG. 14 is a sectional view along line 14—14 of FIG. 8; and

FIG. 15 is a vertical sectional view along line 15—15 of FIG. 3.

Figure 1:
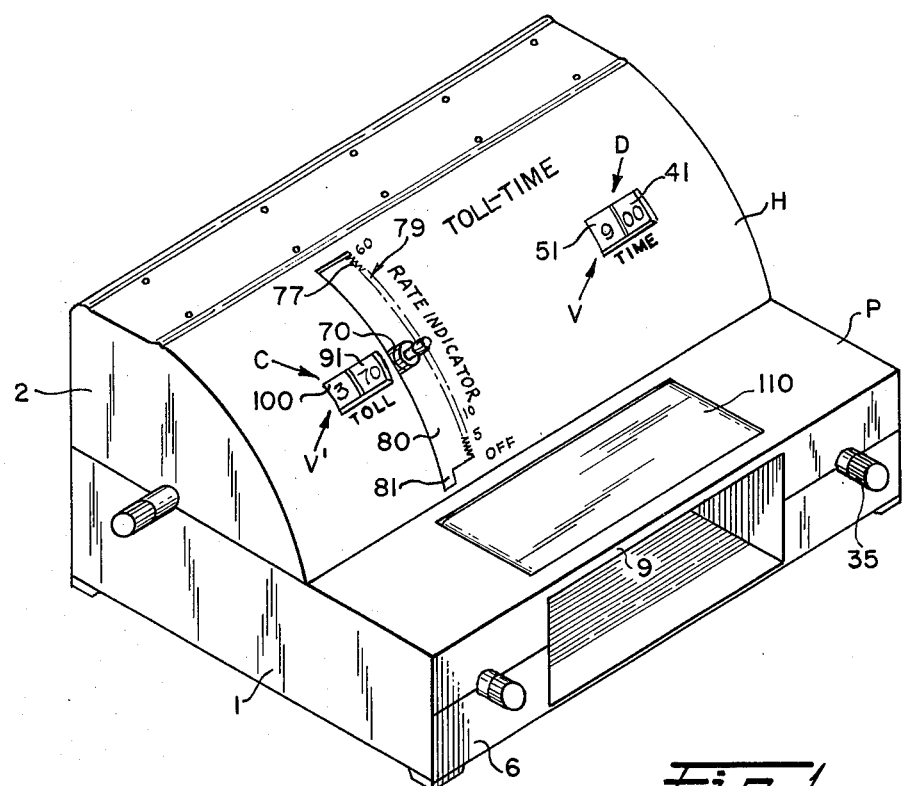
Figure 2:
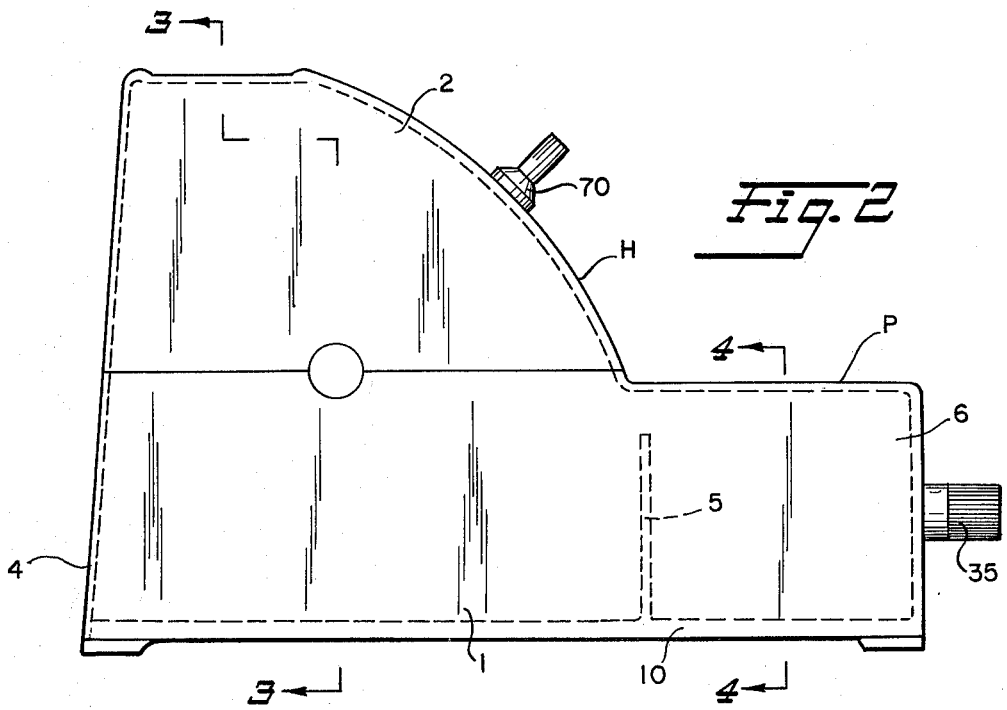
FIG. 2 is a left end view of FIG. 1.

The telephone-call monitor and indicator in accordance with the invention as shown in broad outlines in FIGS. 1 and 2, is constituted by a housing H containing an electrically driven digital clock D and a toll-charge accumulator and indicator C, which are disposed within the housing on a common axis. The housing includes a portion P extending forwardly therefrom for providing a reel of paper, writing paraphernalia and other items which may be useful in recording and storing information relevant to the telephone conversations and the charges therefor.

The housing is preferably molded of high-impact molded plastic material and a plurality of openings may be provided in the top to permit the ventilation of the apparatus and the elimination of any heat generated therein.

The housing may assume the form of a base portion and an overlying cover portion 2 which are joined at a horizontal parting line. The base portion is constituted by a base 10 with end walls 11 and 11' at the opposite ends thereof which are reenforced by a plurality of upstanding webs 12, 13, 14, 15, 16 and 18 molded integrally therewith and extending from the rear wall 4 to the intermediate front wall 5 of the base portion. Webs 22, 23, 25, 26 and 28 are molded integrally with the upper cover 2 of the housing, in mating relation with webs 12, 13, 15, 16 and 18, respectively.

Figure 9:
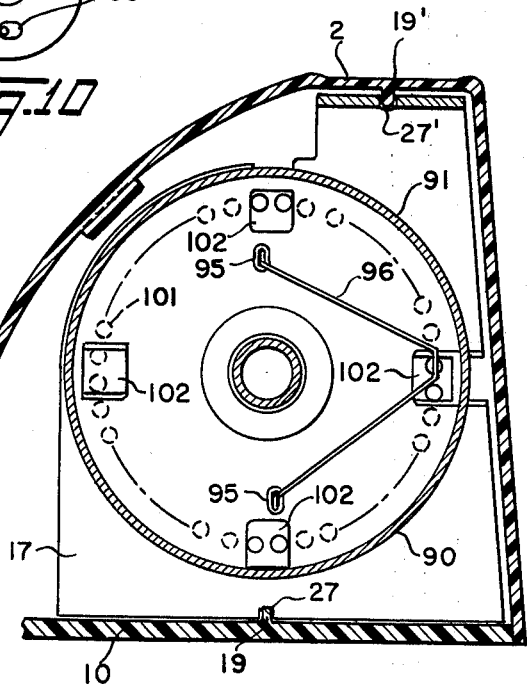
FIG. 9 is a vertical sectional view along line 9—9 of FIG. 3.

Web 17 is mounted loosely within the housing by the provision of slots 27 and 27' at the top and bottom thereof, which respectively engage lugs 19 and 19' extending inwardly from the base 10 and cover portion 2, (FIGS. 3 and 9).

Figures 12, 13:
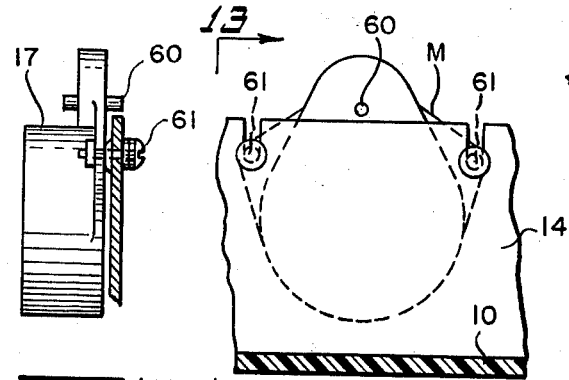
FIG. 12 is a vertical sectional view along line 12—12 of FIG. 3.
FIG. 13 is a vertical sectional view along line 13—13 of FIG. 12.

The web 14, extending upwardly from the base 10 at an intermediate length of the housing, supports an electric clock motor M by means of grommets in web 14 and screw nut and washer fasteners 61, as shown in FIGS. 3, 12 and 13. This clock mechanism may be any standardized form of electric clock operating on standard sixty cycle electric power lines. The operating stem 60 extends from the opposite sides of the clock mechanism and is designed to rotate at one revolution per hour. This clock serves to operate both the digital clock on the right side of the housing and the toll charge indicator on the left side thereof.

The digital clock D is provided with a setting shaft 35 which extends beyond the right end 11' of the housing and which is supported within aligned semi-circular openings in the end wall portions 11' and 21' as well as in corresponding openings in two mating webs adjacent thereto, namely, 12, 22 and 13, 23. This shaft 35 which supports the minute drum 40 with its peripheral face 41 bearing the 60 minute indications, is capable of both longitudinal and rotary movement. When the end of the setting shaft 35 is moved to the right, the clock may be set by clutching the shaft 35 to the hollow axle 37 of the minute drum by means of a pair of radial projections 36 at the end of element 35 engaging a pair of diametrally opposed slots 38 at the end of axle 37. The movement of the setting shaft 35 to the left, effects engagement of the latter with friction clutch 61 mounted on the right end of the actuating stem 60 which, in effect, makes possible the transmission of the drive from the clock mechanism to the minute drum 40. The friction clutch may be formed of resilient fingers lying along a frusto-conical lateral surface which permits the easy disengagement of shaft 35 therefrom when it is desired to set the clock while assuring a positive drive of the latter from the motor M when the setting shaft is moved to the left.

At each revolution of the minute drum 40, that is, at the conclusion of every hour, the hour drum 50, which is disposed to the left of the minute drum 40, is advanced one incremental unit. This is made possible by the provision of 12 or 24 equidistantly disposed apertures 52 adjacent to the periphery of drum 50, one of which is adapted to be engaged every hour for imparting an advancing movement thereto. This movement is executed by the provision of a bifurcated spring 45, the opposite ends of which may be seated in molded seats 42 on the interior of the drum 40 and the bight 46 of which extends transversely to the plane of the arms of the spring 45 and is biased to exert pressure on the web 12,22 as the minute wheel is rotated. The mounting web is provided with an opening 47 adjacent to the periphery of the clock drums; to permit the bight 46 to extend therethrough for engagement with one of the apertures 52 to effect the advance of the hour drum 51 for one unit. The continued rotation of the minute drum 40 serves to cam out the bight 46 from the opening 52 wherein it was engaged, so that the hour hand 50 with the hour indication on the peripheral wall 51 thereof remains fixed for an hour until the bight 46 of the spring again arrives opposite the opening 47, at which time the hour drum 50 is advanced another unit. A window V is provided in the casing to permit a viewing of the hour and minute indicia on the drums of the clock.

Figure 7:
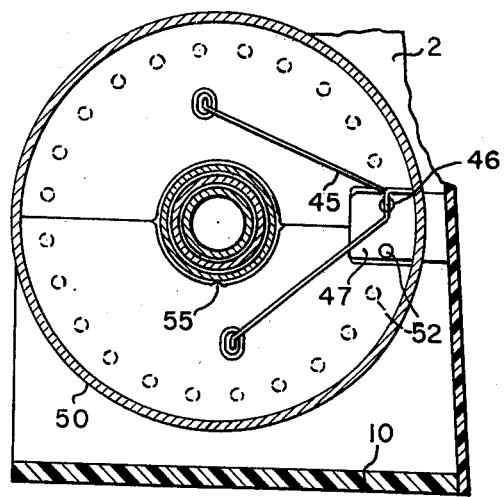
FIG. 7 is a vertical sectional view along line 7—7 of FIG. 3.

In FIGS. 3 and 7 is shown the hour drum 50 provided with 24 apertures 52, to indicate the passage of the 24 hours of a day. However, similar results can be obtained when the drum is marked with a single set of numerals 1 to 12, for indicating twelve hours, which indications are repeated twice a day.

In order to indicate reliably the hourly indications, detent means may be provided between the supporting web 12,22 and the hollow axle of the hour drum 50 by effecting a firm yieldable retention therebetween at all times other than when movement is imparted to the hour drum. This yieldable detent means may be provided by forming a protuberance 55 at the lowermost point of the journal support for the axle of the rotary drum which may be formed with dimples or concavities at points corresponding to the hourly indications on the external face 51 of the drum. Alternatively, the detent means may be in the form of multiple protuberances on the drum with a cooperating recess in the web.

The electric motor M serves not only to drive the digital clock to the right thereof, but also to drive the toll or charge accumulator to the left thereof. For this purpose, the end of the actuating stem 60 opposite the one to which the friction clutch 61 is affixed, is rigidly connected to a coupling member 62 which is provided with one or more arcuate slots 63 which engage pins 64 at the right end of a rotary shaft 66 which is supported for rotation within the laterally disposed webs 15,25 and 16,26. Suitable friction reducing washers W may be inserted within the circular openings in these mating webs to reduce the frictional resistance of the rotary shaft 66. This expedient may also be used at all other points of relative movement between rotary members and fixed supports therefor.

Figure 10:
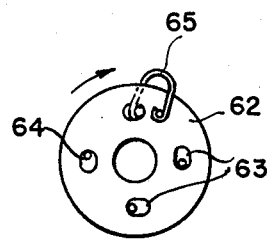
FIG. 10 is a vertical sectional view along line 10—10 of FIG. 3.

The arcuate slots 63, as shown in FIG. 10, subtend an angle of 18°, which represents one-twentieth of a complete revolution of 360° and which corresponds to one-twentieth of an hour or 3 minutes, to provide an idle period between the movement of the actuating stem 60 before the coupling member 62 engages and actuates the pins 64 of the rotary shaft 66, when the trailing edges of the slots 63 come into contact with these pins. A U-shaped biasing spring 65 serves to maintain the relative positions between the pins 64 and the starting end of the radial slots 63 reliably fixed, so that the toll-charge accumulator begins operating only after the passage of the three-minute period which is covered by the toll-charge which is set into the indicator at the start of the long-distance conversation.

As shown in FIGS. 1, 3 and 9, the toll-charge indicator C may be composed of a pair of money indicating drums in side-by-side relation, which, in the illustrated embodiment may be a drum 100 for indicating dollars, and a drum 90 on the right thereof for indicating dime increments, with a viewing window V' in the housing for viewing the accumulated amounts. The charge for the initial three minutes of conversation is pre-set into the indicator, which is thereafter driven by the timing mechanism to accumulate the cost of the telephone conversation with the passage of time, depending upon the setting of a rate indicating lever for the additional minutes of conversing. Thus, the latter charge is composited on the fixed charge for three minutes of the conversation, both of which are determined by reference to a source of information or the telephone operator.

As is evident, it is necessary that the toll-charge accumulator be operated at variable speeds in correspondence to the variations in the varying rates per minute as controlled by the distances between the parties to the conversation. A mechanism embodying frictional variable speed ratios is used for this purpose, as described hereinafter.

The rate indicating lever or member 71 is pivotally mounted within the housing at bearing seats therefor at the junction of the base 10 and rear wall of the housing (FIG. 8) and the free exposed end 70 of the lever is movable within slot 80 in the top wall of the housing, adjacent to the dime increment drum 90. A rate indicating scale 79 is provided along one edge of the opening 80 with the charge indicia noted thereon which, as indicated in FIG. 1, may range from five cents to sixty cents per minute. The lever is fitted with a spring 75 for normally extending the free end 70 outwardly, whereat may be provided a pawl 76 for engagement with the notches 77 at the edge of the slot. The end 70 may be pressed inwardly against the force of the spring 75 to permit the seating of the lever at any desired point of the slot, at the conclusion of which the pawl maintains the setting within a selected notch in fixed positttion, When the lever is in "off" position, an offset recess 81 at the lower end of the slot 80, serves to move the lever to the left which inactivates the mechanism until the lever is moved to one of the charge indicating positions.

Figure 8:
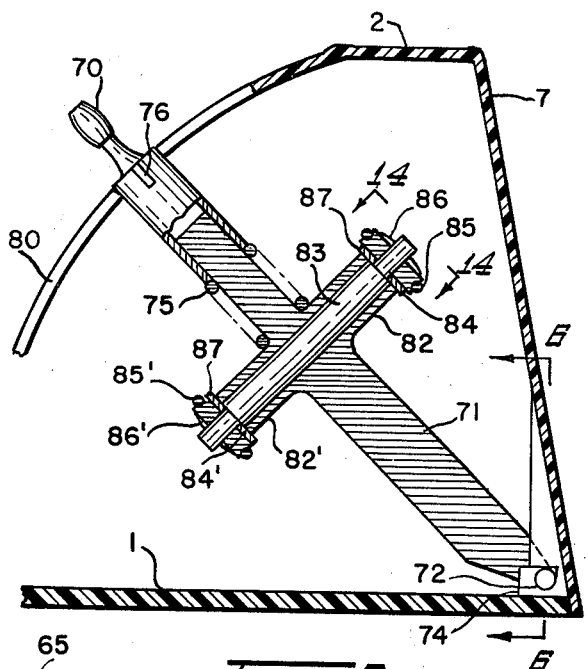
FIG. 8 is a vertical sectional view along line 8—8 of FIG. 3.
Figure 11:
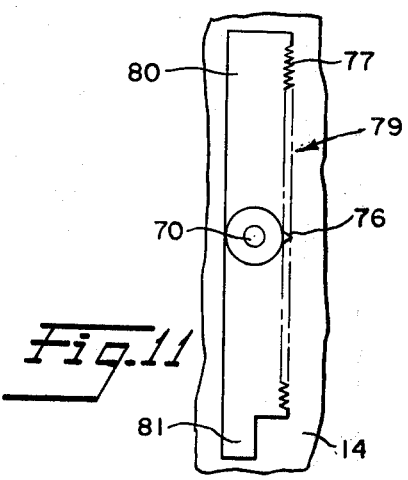
FIG. 11 is a top elevational view of a portion of the housing adjacent to the toll indicator.

The rate indicating lever 71 is provided with bearing supports 82 and 82' extending in opposite directions from the longitudinal axis of the lever, (FIG. 8). A rotary shaft 83 extends through these bearings. A driving wheel 84 is mounted at the upper end of this shaft which is affixed thereon by means of a push-nut retainer 86, and a ring 85 of frictional material such as rubber or the like, is fitted on the periphery of the drive wheel 84. Likewise, a driven wheel 84' is mounted on the opposite end of the rotary shaft 83 and is retained in place at that end of the shaft by means of a push-nut retainer 86'. A ring 85' of resilient material is fitted on the periphery of the driven wheel 84' to assure a reliable drive of the actuating disk 90 of the toll-charge indicator. Preferably, both disks 67 and 90 are serrated or covered with a frictional material to assure driving engagement between the elements without slippage.

The actuating disk for the toll accumulator constitutes part of the dime interval drum of the toll-indicator which, for the sake of convenience, is subdivided into four repetitive portions of ten increments each, as shown in FIG. 9. Thus, at each one-quarter revolution of the drum 90, transfer is made to the dollar drum 100 adjacent thereto. For this purpose, the dime drum 90 is provided with a yielding bifurcated actuating spring 96, the free ends of which are seated within seats 95 formed on the interior of the drum 90, and the bight 97 of which is designed to be projected into the apertures 101 for imparting an incremental movement of the latter at each one-quarter revolution of the drum 90. In order to permit this movement to be effected in such fractional periods of the rotation of the drum 90, four equidistantly disposed openings 102 are formed in the floating web 17, which permit the projection of the bight of the spring 97 therethrough for engagement with one of the openings 101 in the dollar drum (FIGS. 3 and 9).

In the specific arrangement described above, the dollar drum is provided with ten openings 101 in each quadrant, so that the apparatus has sufficient capacity to indicate a telephone charge of $39.90, based upon variable charges per minute ranging from 5 cents to 60 cents, when added on to the initial toll charge for a 3 minute conversation.

In order to impart a reliability to the seating of the dollar wheel, detent means may be provided for the yieldable retention thereof in set position, similar to that described above in connection with the hour hand of the clock mechanism. For that purpose, a protuberance 106 may be provided on the floating web 17 which is adapted to cooperate with dimples 107 on an external part of the rotary dollar drum, which dimples correspond in positioning to the apertures 101 in the dollar wheel.

As shown in FIG. 3, the dime interval drum 90 is formed with a central shaft 94 terminating in a setting member 93 which extends from the end 11 of the housing. This setting shaft is biased for extended movement by means of spring 95 to extend outwardly and to permit free and unrestrained movement of the drum 90. At such time, the drums 91 and 100 are capable of rotary movement to set the dime interval and dollar drums to the cost of the initial 3 minutes of conversation. Whatever movements are imparted to the toll-charge drums for the initial cost of the 3 minute conversation are free of any effects by the time-controlled disk 67 since the rate control lever is seated in the offset notch 81, which results in a gap between disk 67 and driving wheel 84. The setting member 93 is held against spring pressure afforded by spring 95, and upon the setting of the rate indicating lever to the proper position, the member 93 is released gently, which, in effect, brings the driving and driven wheels 84 and 84' into contact with the cooperating disks 67 and 90 to impart rotation from the former to the latter at varying speeds. As may be seen from FIGS. 3 and 8, the rocking of the lever 71 in an upward direction imparts a high speed to driving wheel 84, which is transmitted to the driven wheel 84' at the same rate, and because the same is near the center of disk 90, imparts the greatest speed to the latter.

It is understood that even if more rapid speeds are desired to be imparted to the toll charge indicator, the driven wheel 84' may be designed with a larger circumference in order to impart greater lineal velocities to the actuating disk 90.

At the conclusion of the telephone conversation, the disengagement between the disk 67 and the driving wheel 84 may be effected by separating them incidental to the lodging of the rate indicating lever within the offset notch 81 at the bottom of the opening 80 in the housing. At this time, the toll charge may be read off and noted on a web of travelling paper 110 as it passes over shelf 9 from a reel 111 to a wind-up reel 112. The housing may be formed with a front wall 6 and rearwardly disposed webs 5 which have circular bearings for the supporting mandrels of the reels. An alcove below shelf 9 may be used for the storage of pencils, cards or other writing material.

It is understood that changes may be made to several of the components of the assembly without departing from the spirit of the invention. For example, the detent means for the hour and dollar drums may be modified from the arrangements described above by shaping the external peripheral wall of each drum in the form of a plurality of shallow concavities or substantially flattened surfaces, against which a roller may be pressed to maintain these drums in their set positions. Also, the speed ratios of the frictional drive may be adjusted in fine increments of the 12 settings between 5 cents and 60 cents, by the interposition of washers on the drive shaft 83 at the driving and driven wheels 84 and 84'.

We claim:

1. A telephone-call toll indicating apparatus comprising
    a. a housing having a base portion and a cover portion,
    b. a plurality of webs extending from said base portion and cover portion at laterally displaced points along the length of said housing,
    c. a clock mechanism mounted on one of said intermediate webs with an actuating stem extending from the opposite sides thereof,
    d. a friction clutch at one end of said actuating stem,
    e. a digital clock having an hour indicating drum and a minute indicating drum between said friction clutch and one end of said housing,
    f. an axially moving cylindrical shaft for supporting said minute drum and adapted for selective engagement with said friction clutch for rotation by said clock mechanism at the rate of one revolution per hour, or for separation from said friction clutch for independent setting of said digital clock,
    g. means mounted on said minute indicating drum for engaging the hour indicating drum for one incremental movement of the latter at each single revolution of the former,
    h. a second shaft coaxial with said first-mentioned cylindrical shaft on the opposite side of said clock mechanism, having one end thereof yieldingly coupled to the actuating stem extending therefrom,
    i. a disk at the opposite end of said second shaft adapted to be driven at a constant rotary speed by said clock mechanism,
    j. a rotary toll-indicating device having an actuating disk spaced from said first-mentioned disk for rotation on a common rotary axis,
    k. a rockable setting lever adjustably mounted for pivotal movement between said disks and provided with a rotary shaft extending in opposite directions from the longitudinal axis of said setting lever,
    l. a drive wheel at one end of said shaft adapted for frictional contact with said first-mentioned disk,
    m. a driven wheel at the opposite end of said shaft in frictional contact with said actuating disk for the toll-indicating device, and
    n. a rate-indicating scale adjacent to said rockable setting lever, so that the setting of said lever at a predetermined point of the scale, positions the radial displacements of said driving and driven wheels from their common rotary axis in frictional contact with the respective disks so that the constant rotary movement of said first disk is converted to variable speeds of said rotary shaft and corresponding varying lineal circumferential speeds of said actuating disk of said toll-indicating device.

2. An apparatus as set forth in claim 1, wherein said hour indicating drum comprises a plurality of equidistantly displaced hourly incremental recesses therein and said first-mentioned means comprises a yielding actuator mounted on said minute drum for engaging one of said recesses at each hour for successively advancing said hour indicating drum one hourly increment at each complete revolution of said minute indicating drum.

3. An apparatus as set forth in claim 2, wherein said hourly incremental recesses are 24 in number.

4. An apparatus as set forth in claim 2, wherein the yielding actuator is a bifurcated spring device having the opposite free ends of the arms thereof fixedly seated on said minute indicating drum and the intermediate bight therein extending transversely from the plane of said arms adapted for temporary yielding engagement with one of said recesses.

5. An apparatus as set forth in claim 4, wherein at least one of said webs provides support for said hour indicating drum with interengaging detent means on said one web and an external part of said indicating drum, corresponding to said hourly incremental recesses.

6. An apparatus as set forth in claim 5, wherein said interengaging detent means are constituted by concave dimples on an external journal of said hour indicating drum, corresponding in number and alignment to said recesses therein, cooperating with a convex protuberance on the web supporting said journal having a contour conforming to that of said dimples.

7. An apparatus as set forth in claim 1, wherein the first-mentioned end of said second shaft with the yieldable coupling to the actuating stem of the clock mechanism comprises means for restraining the movement of said second shaft until the termination of a predetermined extent of rotation of said stem.

8. An apparatus as set forth in claim 7, wherein said extent of rotation is 18° corresponding to the movement of the clock mechanism for 3 minutes.

9. An apparatus as set forth in claim 8, wherein said restraining means comprises pin and radial slot connections between said stem and end of said second shaft to permit the actuation of the latter to be delayed until the termination of said period of time.

10. An apparatus as set forth in claim 9, wherein said pin and radial slot connections comprise a light bowed spring for biasing said connections to a uniform starting point.

11. An apparatus as set forth in claim 7, including an actuating rod for said toll indicating device extending from the end of said housing remote from said digital clock, and connections between said rod and said toll indicating device for setting the latter to an initial amount representing the toll charge for the initial idle period of said second shaft.

12. An apparatus as set forth in claim 7, including an actuating rod for said toll indicating device extending from the end of said housing remote from said digital clock, connections between said rod and said toll indicating device for setting the latter to an initial amount representing the toll charge for the initial idle period of said second shaft, and means for subsequently moving said drive wheel into frictional contact with said first-mentioned disk.

13. An apparatus as set forth in claim 12, wherein the toll indicating device is constituted by a dollar drum and dime-increment drum adjacent to each other, with the latter forming part of said actuating disk adapted for movement by either driven wheel at the end of said rotary shaft or directly by said actuating rod.

14. An apparatus as set forth in claim 13, wherein said dollar drum is provided with an end wall having a plurality of equidistantly displaced circumferential openings, and said dime-increment drum is provided with a spring device mounted thereon having a part thereof adapted for resilient engagement with one of said openings at the end of the increments of said dime-increment drum, for advancing one incremental unit of said dollar drum, which is followed by the disengagement of said last-mentioned part from said opening upon the continued rotation of said dime-increment drum.

15. An apparatus as set forth in claim 13, wherein at least one of said webs provides support for said dollar drum, and interengaging detent means on said one web and an external portion of said dollar drum, corresponding to the circumferential openings in the latter, representing the incremental dollar values thereon.

16. A telephone-call toll indicating apparatus comprising
 a. a timing mechanism,
 b. a disk adapted to be driven at a constant speed by said timing mechanism,
 c. a rotary toll-indicating device having an actuating disk spaced from said first-mentioned disk for rotation on a common rotary axis,
 d. a rockable setting lever adjustably mounted for pivotal movement between said disks and provided with a rotary shaft extending in opposite directions from the longitudinal axis of said setting lever,
 e. a drive wheel at one end of said shaft adapted for frictional contact with said first-mentioned disk,
 f. a driven wheel at the opposite end of said shaft in frictional contact with said actuating disk for the toll indicating device, and
 g. a rate-indicating scale adjacent to said rockable setting lever so that the setting of said lever at a predetermined point of the scale positions the radial displacements of said driving and driven wheels from their common rotary axis in frictional contact with the respective disks so that the constant rotary movement of said first disk is converted to variable speeds of said rotary shaft and corresponding varying lineal speeds of said actuating disk of said toll-indicating device.

17. An apparatus as set forth in claim 16, including a lost-motion device between said timing mechanism and first-mentioned disk for delaying the actuation of said disk by said timing mechanism for a predetermined period.

18. An apparatus as set forth in claim 17, including an actuating rod for said toll-indicating device and connections between said rod and said toll-indicating device for setting the latter to an initial amount representing the toll charge for the initial idle period of said first-mentioned disk.

19. An apparatus as set forth in claim 17, including an actuating rod for said toll-indicating device, connections between said rod and said toll-indicating device for setting the latter to an initial amount representing the toll charge for the initial idle period of said first-mentioned disk, and means for moving said drive wheel into frictional contact with the latter.

20. An apparatus as set forth in claim 19, wherein the toll-indicating device is constituted by a dollar drum and dime-increment drum adjacent to each other, with the latter forming part of said actuating disk adapted for movement by either said driven wheel at the end of said rotary shaft or directly by said actuating rod.

21. An apparatus as set forth in claim 20, wherein said dollar drum is provided with an end wall having a plurality of equidistantly displaced circumferential openings, and said dime-increment drum is provided with a spring device mounted thereon having a part thereof adapted for resilient engagement with one of said openings at the end of ten increments of said dime-increment drum, for advancing one incremental unit of said dollar drum, which is followed by the disengagement of said last-mentioned part from said openings upon the continued rotation of said dime-increment drum.

22. An apparatus as set forth in claim 20, wherein at least one of said webs provides support for said dollar drum, and interengaging detent means on said one web and an external portion of said dollar drum corresponding to the circumferential openings in the latter, representing the incremental dollar values thereon.

23. An apparatus as set forth in claim 21, wherein said spring device comprises a pair of yielding bifurcated arms disposed in a plane substantially perpendicular to the axis of rotation of said toll-indicating device with the free ends thereof fixedly seated on said dime-increment drum and said part constituting the bight junction of said arms extending transversely to said plane for successive yielding engagement with said openings.

24. A long-distance telephone-call toll indicating apparatus comprising
 a. a housing,
 b. a timing mechanism mounted in said housing terminating in a rotating actuating stem,
 c. a clock device adjacent to one end of said stem,
 d. clutch means at said one end of said stem for selectively coupling said timing mechanism to said clock device to indicate the passage of time,
 e. a rotary disk connected to the opposite end of said stem for rotary movement by said timing mechanism,
 f. a toll-charge indicator adjacent to said rotary disk comprising a complemental disk facing said first-mentioned rotary disk,
 g. a member mounted adjustably between said disks bearing a rotary axle fitted with friction rings adjacent to the opposite ends thereof for selective driving contact with a respective one of said disks,
 h. means for adjusting said member and the consequent placement of said friction rings relative to the coaxial centers of said disks to vary the speed-ratio from the constant-speed timing mechanism to the varying speed of the complemental disk of the toll-charge indicator, in correspondence to the variable charges for time-units of telephone communication depending upon the distance spanned by the communication line, and
 i. means for coupling said toll-charge indicator to said first-mentioned rotary disk at the start of the telephone conversation.

25. An apparatus as set forth in claim 24, including a lost-motion device in the connections between said first-mentioned rotary disk and the opposite end of said stem for delaying the rotation of said disk by said timing mechanism for a predetermined period.

* * * * *